(12) United States Patent
Sasaki et al.

(10) Patent No.: US 6,551,528 B1
(45) Date of Patent: Apr. 22, 2003

(54) WAVELENGTH CONVERSION CRYSTAL AND METHOD FOR GENERATING LASER BEAM, AND APPARATUS FOR GENERATING LASER BEAM

(75) Inventors: Takatomo Sasaki, Osaka (JP); Yusuke Mori, Osaka (JP); Masashi Yoshimura, Hiroshima (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

(21) Appl. No.: 09/647,137

(22) PCT Filed: Mar. 29, 1999

(86) PCT No.: PCT/JP99/01598

§ 371 (c)(1),
(2), (4) Date: Nov. 14, 2000

(87) PCT Pub. No.: WO99/50709

PCT Pub. Date: Oct. 7, 1999

(30) Foreign Application Priority Data

Mar. 27, 1998 (JP) .......................... 10-082309
Jan. 28, 1999 (JP) .......................... 11-020550
Jan. 29, 1999 (JP) .......................... 11-022969

(51) Int. Cl.$^7$ ................................ G02B 5/20
(52) U.S. Cl. .................. 252/584; 372/21; 423/263
(58) Field of Search .................. 372/21, 22, 105, 372/109; 117/944; 252/584; 423/263

(56) References Cited

U.S. PATENT DOCUMENTS 5,177,752 A * 1/1993 Ohya et al. ............... 372/22
6,083,319 A * 7/2000 Aka et al. ................. 117/13

* cited by examiner

Primary Examiner—Paul Ip
Assistant Examiner—Davienne Monbleau
(74) Attorney, Agent, or Firm—Wenderoth, Lind & Ponack, L.L.P.

(57) ABSTRACT

As a wavelength conversion crystal whose double refraction index is controllable, a crystal represented by a formula (I), $M^1_x M^2_{1-x} Ca_4 O(BL_3)_3$, where each of $M^1$ and $M^2$ represents one or more types of different rare earth elements and $0 < x < 1$, is used, and as a novel means for second harmonics generation, a nonlinear optical crystal represented by a formula (II), $Gd_x Y_{1-x} Ca_4 O(BO_3)_3$, where $0.01 \leq x \leq 0.35$, is used to generate second harmonics.

15 Claims, 10 Drawing Sheets

US 6,551,528 B1

WAVELENGTH CONVERSION CRYSTAL AND METHOD FOR GENERATING LASER BEAM, AND APPARATUS FOR GENERATING LASER BEAM

This is a 371 application of PCT/JP99/01598 filed Mar. 29, 1999.

BACKGROUND OF THE INVENTION

1. Field of the Invention

The present invention relates to a wavelength conversion crystal, and a method and apparatus for generating a laser beam. More particularly, the present invention relates to a novel wavelength conversion crystal useful as a nonlinear optical crystal, and a method and apparatus for generating a laser beam.

2. Description of the Related Art

With the drastic revolution of laser technologies in recent years, it has become a major challenge to perform the wavelength conversion of a near-infrared solid-state laser beam using a nonlinear optical crystal.

A solid-state laser has a narrow spectral bandwidth and stable output, and is easily maintained and feasible for miniaturization, so that it is attracting attention as a means for laser processing and laser-based medical treatments, and also for applications such as surface reforming and optical information processing. In order to capitalize on these beneficial properties of such solid-state lasers, the wavelength conversion technologies have become increasingly important.

An ideal nonlinear optical crystal for such wavelength conversion is required to have; i) a large nonlinear optical constant; ii) a short absorption edge; and iii) an adequate double refraction index. Also, as a crystal, it is further desired to have; iv) superior mechanical properties; from a practical point of view.

The term "iii) an adequate double refraction index" is a double refraction index that satisfies its non-critical phase matching condition under which the wavelength conversion is performed most efficiently. When the double refraction index is smaller than the ideal value, the wavelength conversion would become impossible, and when it is larger, the conversion efficiency would degrade since such a large value results in the departure from the non-critical phase matching condition.

Nonlinear optical crystals have been studied from various viewpoints, and among them, calcium oxyborate-type (COB) crystals are attracting attention.

For example, the non-linearity had been found in $GdCa_4O(BO_3)_3$:GdCOB by Aka et al., and the growth and optical properties of its single crystal had been reported in 1996. It had been found that this GdCOB;

- can be grown by the Cz method, and is non-water-soluble;
- has a Vickers hardness of approximately 600 (as hard as quartz);
- has $d_{eff}$ (at 1064 nm) of 1.3 pm/V (about 3.4 times of KDP);
- has a phase matching threshold wavelength of 840 nm; and
- is incapable of generating third harmonics of Nd:YAG.

However, the major drawback of this GdCOB is in the fact that its double refraction index is as small as 0.033.

That is, although this $GdCa_4O(BO_3)_3$(GdCOB) crystal is easy to grow and superior in its mechanical properties, the wavelength it can possibly generate through wavelength conversion is long because its double refraction index is small. Accordingly, the inventors of the present invention have discussed a means to increase this double refraction index, and found that when Gd in a $GdCa_4O(BO_3)_3$ (GdCOB) crystal is replaced by Y, its double refraction index increases. As a result, while a GdCOB crystal can only generate second harmonics of an Nd:YAG laser, the YCOB in which Gd is substituted by Y can generate third harmonics of an Nd:YAG laser.

The inventors of the present invention have already proposed this newly discovered YCOB crystal in a concretive manner.

However, since the arbitrary control over the double refraction indices of COB crystals had been believed to be impossible, the inventors of the present invention extended their discussion over COB as a nonlinear optical crystal for wavelength conversion, and set their objectives to provide a novel technical approach which allows the optimization control over the double refraction indices, as a critical requirement for especially wavelength conversion.

In addition, for wavelength conversion crystals, the conversion to second harmonics has also presented a critical problem.

This problem stems out from the fact that, $LBO(LiB_3O_5)$ crystal currently used as a wavelength conversion crystal for generating second harmonics of Nd:YAG laser has quality problems and its growing cost is high since this LBO crystal is a water-soluble crystal so that it does not provide a sufficient life span and reliability, and in addition, since it has to be used at a temperature of as high as 148° C., and the crystal growth is difficult. Therefore, there has been a demand for the development of a wavelength conversion crystal, which can substitute LBO crystal for generation of second harmonics of Nd:YAG laser. Especially, there has been a strong demand for a wavelength conversion crystal which can generate second harmonics of Nd:YAG laser in a manner in which the non-critical phase matching condition can be satisfied even under a room temperature, which has not yet been implemented in the past.

Furthermore, various types of optical elements for wavelength conversion have previously been proposed. For example, a wavelength conversion element has been used in an ultraviolet laser beam oscillator for converting an infrared beam into an ultraviolet beam. However, in the prior art, a large number of optical elements were required, resulting in complexity in the optical system, and thus, making it difficult to construct a small laser beam oscillator.

Moreover, there had been proposed a crystal element, which allows the generation of second harmonics as well as the oscillation of an infrared laser beam with this one same element. However, it has been difficult to obtain a crystal element capable of generating up to third harmonics.

Accordingly, a novel multifunctional laser beam generator has been desired, which, as a single optical element, has multi-functionality, and is capable of generating second and third harmonics, and is also capable of being implemented in a small ultraviolet laser beam generator.

SUMMARY OF THE INVENTION

The present invention first provides a wavelength conversion crystal, which is expressed in the following formula (I); $M^1_xM^2_{1-x}Ca_4O(BO_3)_3$; where each of $M^1$ and $M^2$ represents one or more type of different rare earth elements, and $0<X<1$.

More particularly, the present invention provides also a wavelength conversion crystal in which $M^1$ and $M^2$ of the above formula are selected from a group comprising Gd, Y, La and Lu.

As stated above, the present invention is based on an X-ray diffraction observation made on a sintered body, which verified that, for GdCOB expressed by $GdCa_4O(BO_3)_3$, it is not only possible to replace the Gd with Y, it is also possible to introduce the rare earth elements such as Lu and La etc. into the Gd site so as to change the lattice constant. Since there is a correlation between a lattice constant and a refractive index, the change in the lattice constant would mean a change in the double refraction index of the crystal. Accordingly, the discussion was further extended, and it was found that the double refraction index could be arbitrary controlled by changing the ratios of Gd, Y, Lu and La, and this discovery provided integrity to the present invention. That is, the double refraction index changes in the order of, for example, Lu>Y>Gd>La. As a result, an optimal double refraction index can be obtained for any arbitrary wavelength from third harmonics (355 nm) to second harmonics (532 nm) of Nd:YAG laser, so that the non-critical phase matching condition can always be satisfied.

The present invention secondly provides a novel means for generating second harmonics, which allows an optimization control over the double refraction index of a COB crystal to replace the LBO crystal that has previously been used for second harmonics generation.

That is, the present invention provides a nonlinear optical crystal for second harmonics generation, which is represented by the following formula (II); $Gd_xY_{1-x}Ca_4O(BO_3)_3$; where $0.01 \leq X \leq 0.35$.

The present invention also provides a method for generating laser beam wherein the laser beam is sent through a nonlinear optical crystal represented by this formula (II) to convert it into second harmonics, and an apparatus for generating laser beam comprising this crystal as a means for generating second harmonics.

Furthermore, the present invention also provides a laser beam generator having a nonlinear optical crystal as a means for generating third harmonics.

The present invention thirdly provides, as a novel laser beam generator capable of generating the fundamental wave of laser, and wavelength-converted beams of second and third harmonics, a laser beam generator comprising a nonlinear optical crystal of calcium oxyborate-type crystal containing Gd and Y with Yb or Nd doped thereto, and wherein this crystal element is configured to be able to perform the laser oscillation of the fundamental wave and the generation of second and third harmonics laser beams.

Figure 3:
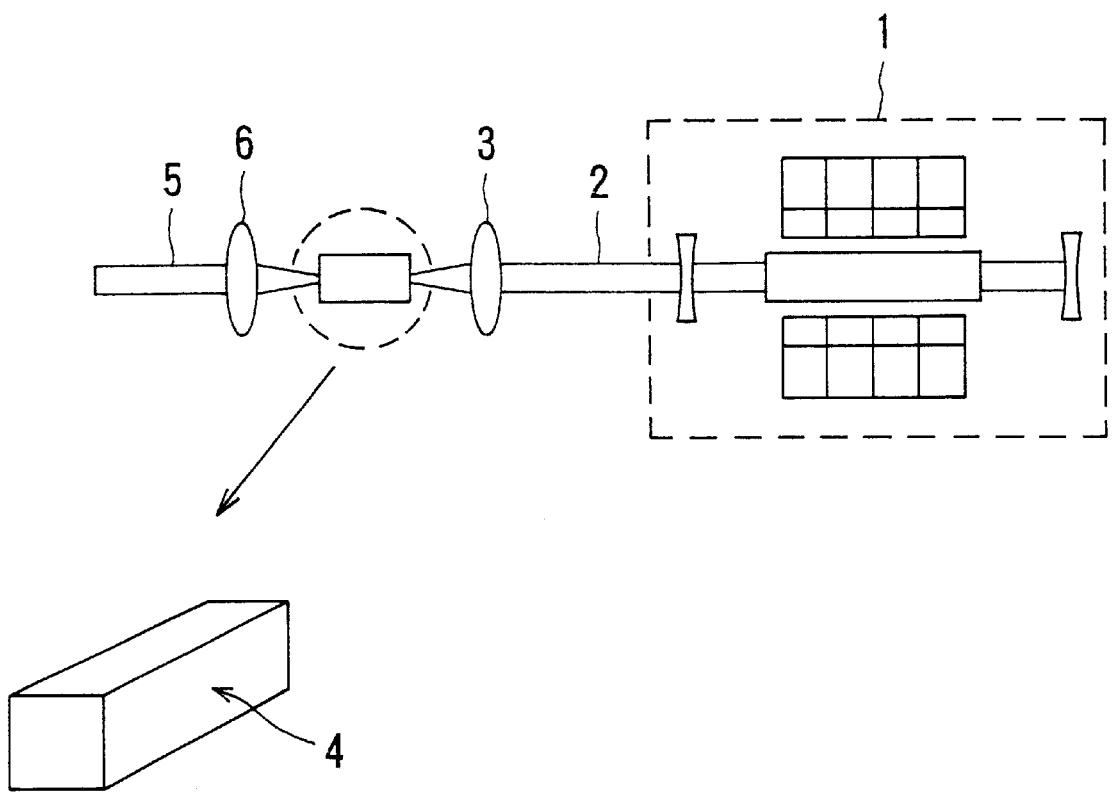
FIG. 3 is a schematic diagram of an exemplary method for generating second harmonics and apparatus configuration therefor.

The descriptions of reference numerals shown in FIG. 3 are as follows; 1: Nd:YAG infrared laser beam oscillator, 2: near-infrared beam, 3: convex lens, 4: nonlinear optical crystal, 5: green laser beam, 6: convex lens.

DESCRIPTION OF THE PREFERRED EMBODIMENTS

The present invention has the features and background as set forth above, and embodiments thereof will now be explained in greater detail.

In the wavelength conversion crystal of the present invention, which is expressed in the above formula (I), the rare earth elements of $M^1$ and $M^2$ are different from each other. These may be rare earth elements including Gd, Y, La and Lu etc.

Although the method for growing crystal is not limited to a particular method, it may be grown by, for example, the high frequency induction heating Cz method.

Also, while the inventors of the present invention attempt to realize the generation of third harmonics under a non-critical phase matching condition at a room temperature and at a rising temperature using $Gd_xY_{1-x}Ca_4O(BO_3)_3$ whose Gd portion has been replaced, the same thing is made possible in the generation of second harmonics (a green light beam having a wavelength of 532 nm) using a nonlinear optical crystal having a composition of the formula (II).

It should be noted that the compositional ratio "x" in the formula (II) is limited to a range between 0.01 and 0.35. It should be considered that, especially at a room temperature, an optimal value of "x" for the generation of second harmonics is equal to, or in the proximity of 0.28.

Figure 1:
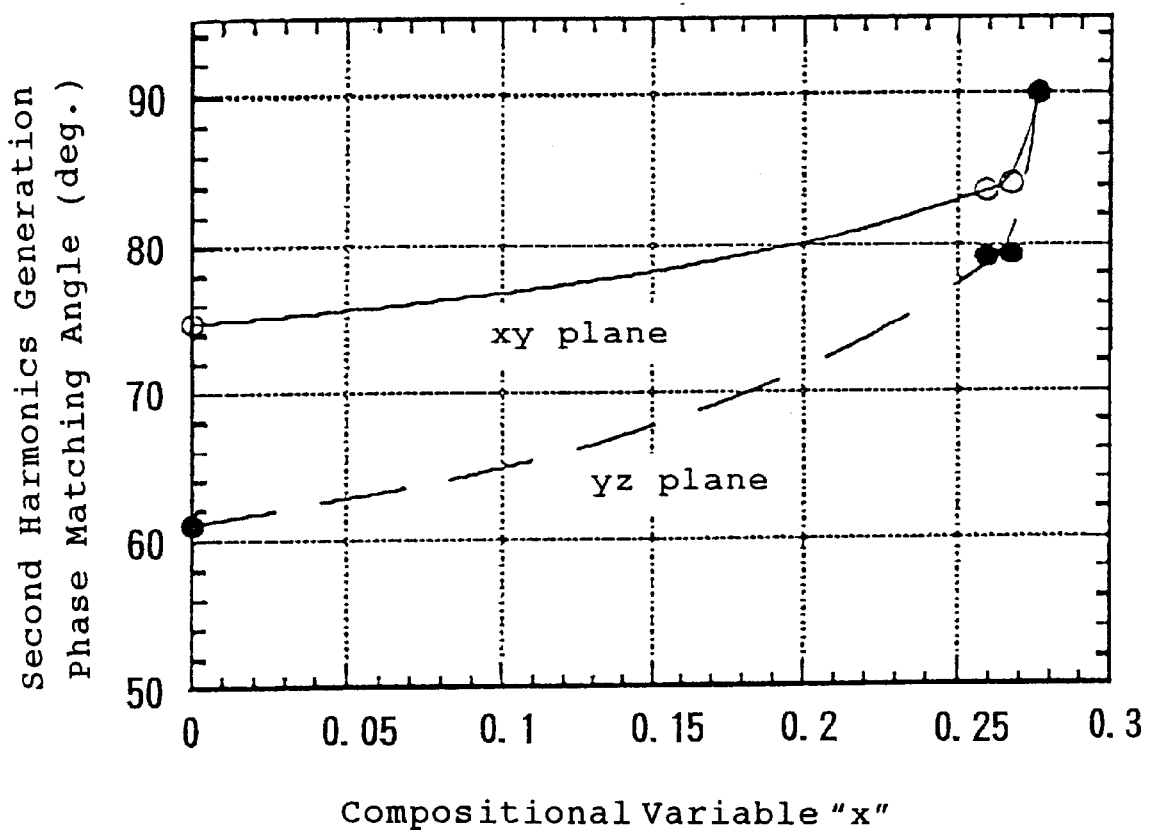
FIG. 1 illustrates the relationship between the compositional variables "x" and phase matching angles in the generation of second harmonics.

For example, when the proportion of Gd is in the proximity of 28% (x=0.28), it is certain that second harmonics are generated under the non-critical phase matching condition. FIG. 1 illustrates an exemplary generation of second harmonics.

It should be noted that a compositional ratio "x" correlates to a phase matching angle and a temperature at which the crystal is being held. By controlling the temperature, the relationship between the phase matching angle and compositional ratio "x" can be controlled. For example, the compositional ratio "x" can generally be smaller when the crystal temperature is increased.

In the past, the generation of second harmonics was only possible with an LBO crystal heated to 148° C. on a practical level, so that the crystal of the present invention is a breakthrough as it allows such generation at a room temperature, and by varying the composition, at various other temperatures. As for its properties, its stability in relation to the angle (angle tolerance) is significantly improved compared to those of other crystals, and that can be clearly seen from the data of this crystal shown in FIG. 2, and from the table below which is the comparison made with a conventional case. The term "angle tolerance" means a range of angle in relation to a 1 cm crystal element, extending between angles that would cause the output of the element to be reduced to one half.

Table 1
Angle Tolerances of Various Crystals for Second Harmonics

Generation
[unit in mrad cm, and in mrad cm$^{1/2}$ at NCPM(non-critical phase matching)]

| GdYCOB (X-0.28) | type 2-NCPM | 119 |
| --- | --- | --- |
| LBO (148° C.) | type 1-NCPM | 71.9 |
| LBO | type -1 | 9 |
| CLBO | type -2 | 1.7 |
| KD*P | type -2 | 5.0 |
| KTP | type -2 | 15 |

Since the directions of the fundamental wave (infrared beam, wavelength:1064 nm) and second harmonics (a green light beam) are completely identical (walk off angle: 0°), the interaction length is long. It is its characteristic that the incident light beams are conveniently overlapped on the next stage for generating higher harmonics, so that it is advantageous for wavelength conversion.

One more important thing is that, at a room temperature, the second harmonics can be output to the direction which satisfies the non-critical phase matching condition of third harmonics when the composition of Gd is approximately x=0.28. This was discovered for the first time in the world. It is not possible to simultaneously and directly generate, from a fundamental wave to third harmonics, but by taking advantage of this identical directional property, the following applications may be contemplated.

1. Only a single body of this crystal is inserted into a resonator in which a large number of elements are not desirable, to generate second harmonics and third harmonics.

2. By doping a laser medium (Nd:neodium or Yb:ytterbium) into the crystal, and additionally incorporating a laser oscillation function to perform, from laser oscillation to ultraviolet beam generation with the use of the single element.

A laser oscillator used in the green laser beam generation method of the present invention is outlined in FIG. 3. In this apparatus, for example, a near-infrared beam 2 having a wavelength of 1064 nm output from an Nd:YAG infrared laser beam oscillator 1 is converged by a convex lens 3, and wavelength-converted to a second harmonics having a wavelength of 532 nm by a nonlinear optical crystal 4 of the present invention, and then controlled in its laser spot diameter by a convex lens 6 to be output as a green laser beam 5.

In the laser beam oscillator shown in FIG. 3, in addition to the aforementioned nonlinear optical crystal 4, another nonlinear optical crystal of a similar composition is disposed to change the angle of a light incident plane, causing to combine the infrared laser beam of 1064 nm and the green laser beam of 532 nm, so that an ultraviolet laser beam (third harmonics)of 355 nm can be generated.

Under a room temperature, the generated ultraviolet laser beam of 355 nm may cause to generate brownish fogging within the crystal, which may degrade its conversion efficiency. However, it may vanish in time, or may be removed by raising the temperature. It was confirmed that such degradation of the conversion efficiency does not occur in a case where the generation of the ultraviolet laser beam of 355 nm is performed while raising the temperature.

For example, an apparatus comprising the above means may be used as a laser beam generator of the present invention.

Although it is not limited, the crystal growth may be performed, for example, by a high frequency induction heating Cz method.

In relation to a laser beam generator such as the above, since a calcium oxyborate crystal containing Gb and Y has a property as a nonlinear optical element, which allows a second harmonics to be output under a non-critical phase matching condition in the direction same as the direction that satisfies the non-critical phase matching condition of third harmonics, the present invention takes advantage of this identical directional property, and realizes to perform from the laser oscillation to the ultraviolet beam generation, with the single crystal element by doping a laser medium (Yb:ytterbium or Nd:neodium) into the crystal, and by adding a laser oscillation function.

The present invention also realizes to make it in a one-chip configuration with low reflection loss by an existing diffusion welding method.

Figure 4:
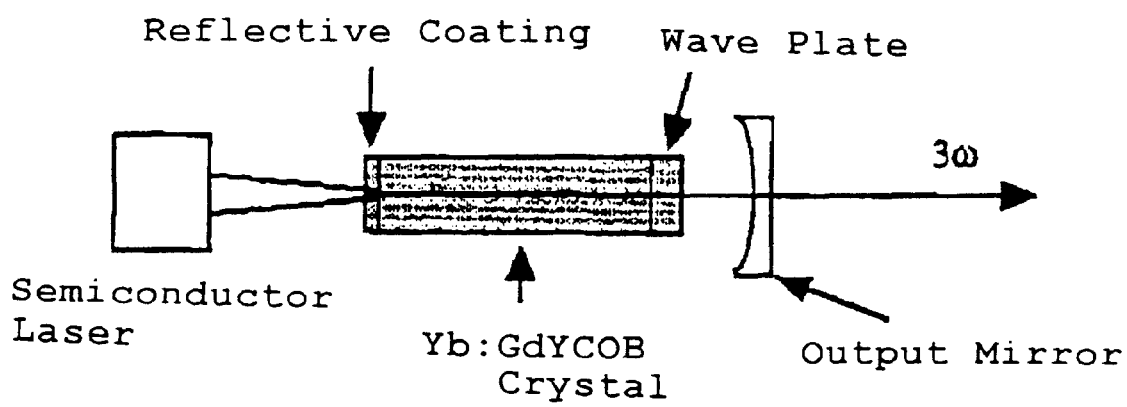
FIG. 4 is a schematic diagram of an exemplary configuration of an ultraviolet laser beam generator by semiconductor laser excitation.

For example, in the present invention, by providing the configuration illustrated in FIG. 4, which uses an internal resonator structure, a small ultraviolet laser beam generator by means of semiconductor laser excitation can be provided.

In this configuration of FIG. 4, calcium oxyborate (COB) containing Gd and Y, to which Yb is doped, for example, is used. Any suitable excitation semiconductor laser, reflective coating and wave plate may be used. For example, as for the semiconductor laser for excitation, one with an oscillation wavelength up to 900 nm may be used, and for reflective coating, one having a multi-layer structure may be used.

Figure 5:
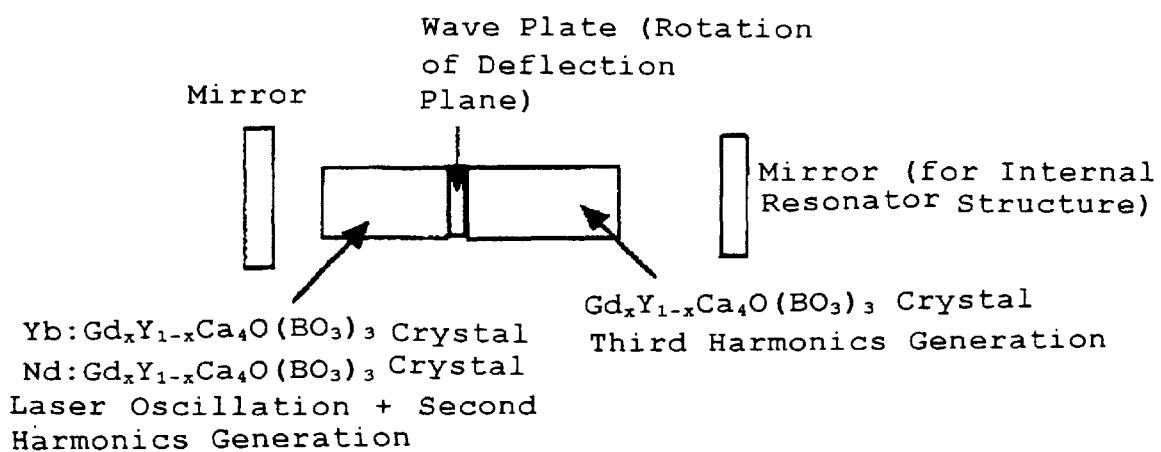
FIG. 5 is a schematic diagram of an exemplary configuration of another laser beam generator.
Figure 6:
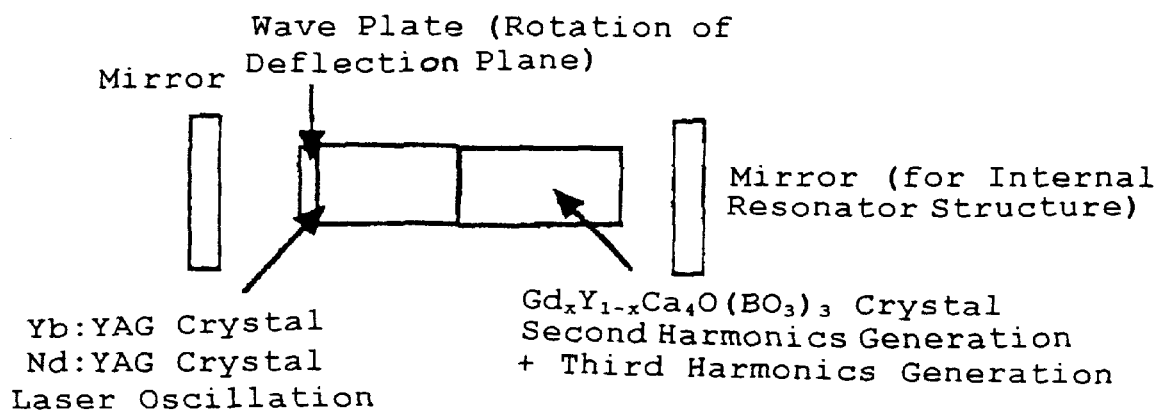
FIG. 6 is a schematic diagram of an exemplary configuration of yet another laser beam generator.

Furthermore, in the present invention, it is possible to present exemplary laser beam generators such as the ones shown in FIGS. 5 and 6 that can be manufactured through a diffusion welding technique.

For example, an apparatus having means described above may be used as a laser beam generator of the present invention.

Although the method for growing crystal is not limited, a high frequency induction heating Cz method may be used. Yb or Nd may be doped by mixing it into the raw material of COB containing Gd and Y, during the growth of this crystal. The doses of Yb and Nd may be determined in consideration of a desired property and application, and for example, approximately 0.5–30% or 2–20% may typically be considered. The present invention will now be further explained in detail according to the following Examples. However, the Examples are merely illustrative in nature and serve as representative examples of the preferred embodiments. Other examples within the scope of the claims are possible. Thus, the following Examples should not be construed to narrow the spirit and scope of the claims.

EXAMPLES

Example 1

Figure 7:
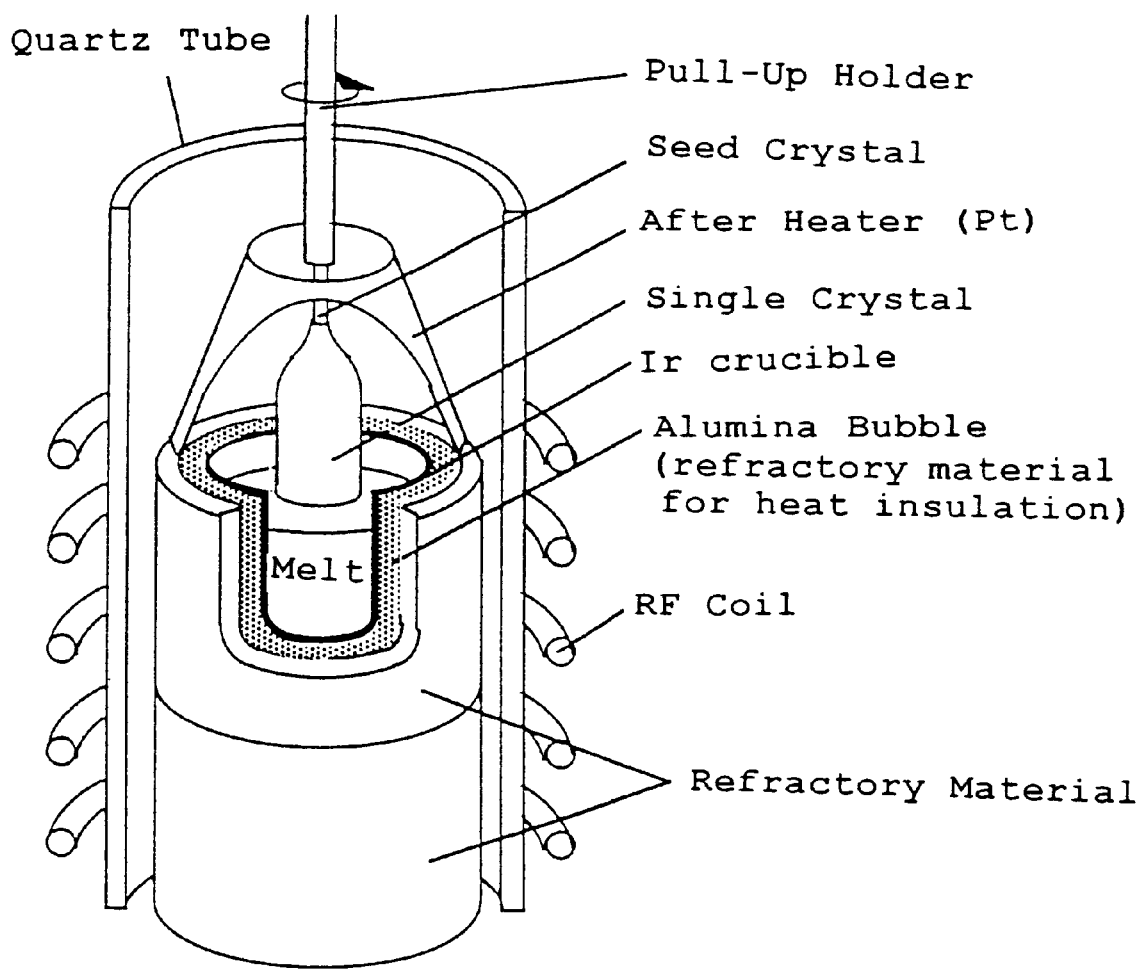
FIG. 7 is a perspective view of an apparatus for crystal growth with a part of it removed.

In the setup shown in FIG. 7, a crystal was grown through a high frequency induction heating Cz method. As for materials, an oxide of a rare earth element ($RE_2O_3$) was used along with $CaCO_3$ and $B_2O_3$.

In an iridium (Ir) crucible having a diameter of 50 mm, the crystal was grown in an argon (Ar) ambient at a temperature of, for example, 1510° C.

<1> $Gd_{0.48}Y_{0.52}COB$

Figure 8:
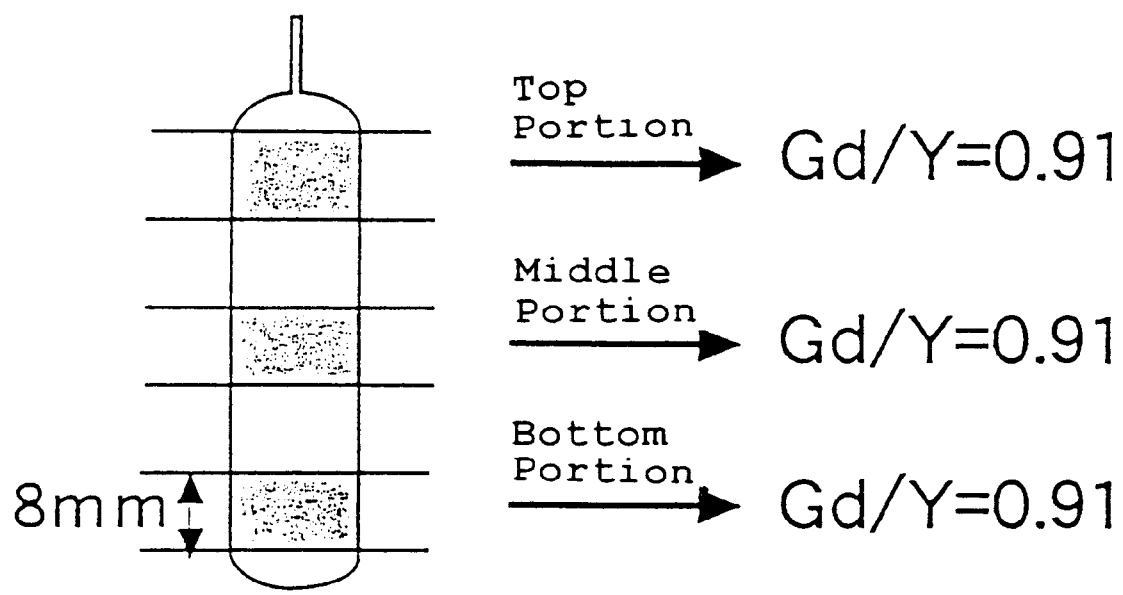
FIG. 8 is a diagram illustrating portions of grown crystal for compositional analysis and ratios of Gd/Y.

A crystal of $Gd_{0.48}Y_{0.52}COB$ was grown under the following conditions. Seed Orientation: "a" axis (YCOB crystal) Growth Rate: 7 mm/h Rotational Speed: 20 rpm Crystal Length: approximately 45 mm The crystal grown in a length of 4 cm was divided into 5 portions as shown in FIG. 8, and the compositions of top, middle and bottom portions were measured by ICP. As a result, all of them were found to have a constant and homogeneous composition of Gd/Y=0.91.

This result also confirmed that a crystal of $Gd_xY_{1-x}Ca_4O(BO_3)_3$ is a solid solution.

Figure 9:
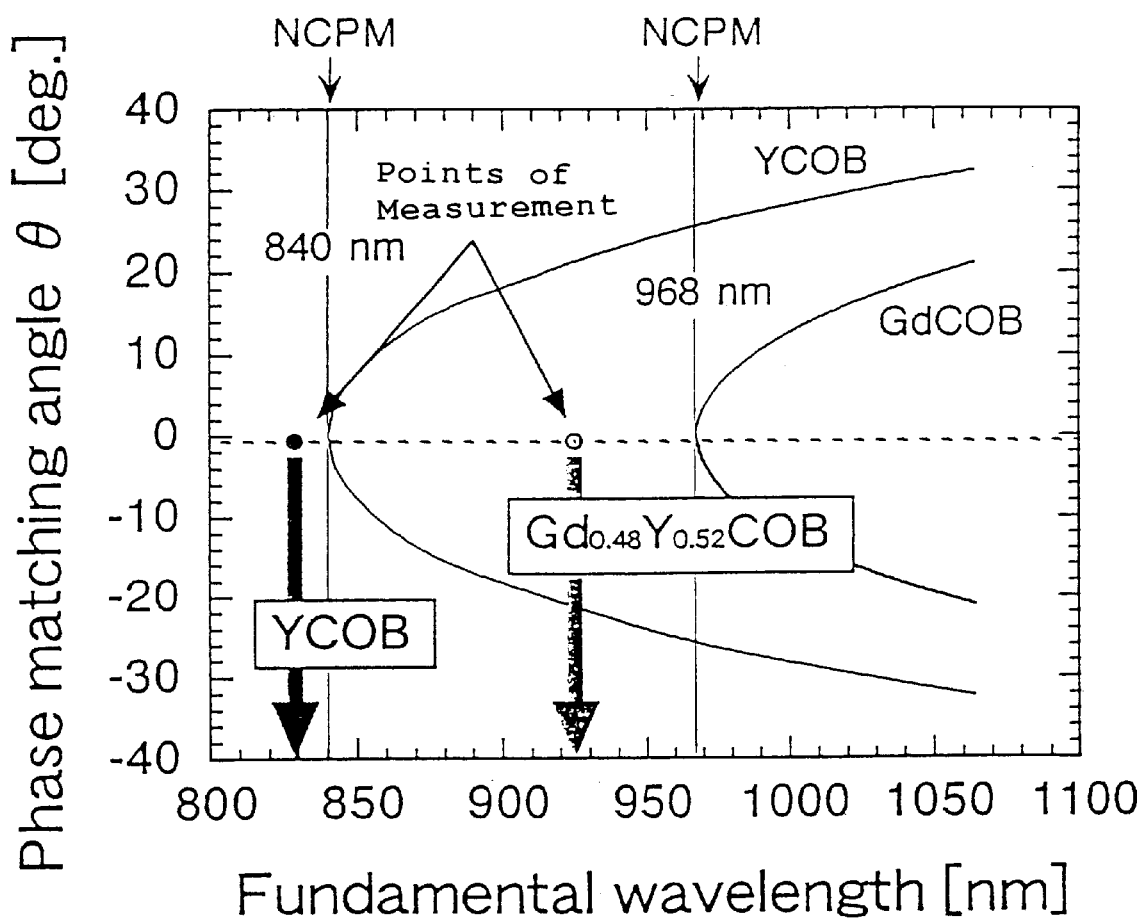
FIG. 9 is a diagram showing results of calculations of non-critical phase matching wavelength in the z-axis direction.

The non-critical phase matching wavelength in the generation of second harmonics was found to be 920 nm, which falls between 970 nm of a GdCOB crystal and 840 nm of an YCOB crystal. The non-critical phase matching wavelength in "z" axis direction is calculated as shown in FIG. 9. This suggests that, between 840 nm and 970 nm, a $Gd_xY_{1-x}COB$ crystal can be grown to have homogeneous composition with an arbitrary value for "x", and its double refraction index can also be controlled by the value of "x".

<2> $La_xGd_{1-x}Ca_4O(BO_3)_3$, $Y_xLu_{1-x}Ca_4O(BO_3)_3$

In the same manner as the above, combinations other than the combination of Gd and Y were also discussed. As a result, it was found that, as well as $Gd_xY_{1-x}Ca_4O(BO_3)_3$, $La_xGd_{1-x}Ca_4O(BO_3)_3$ and $Y_xLu_{1-x}Ca_4O(BO_3)_3$ are also expected to have a superior wavelength conversion property in the generation of third harmonics (355 nm) to second harmonics (532 nm) of Nd:YAG laser.

Example 2

The crystals were grown through a high frequency induction heating Cz method. As for materials, $Gd_2O_3$ and $Y_2O_3$ are used along with $CaCO_3$ and $B_2O_3$.

In an iridium (Ir) crucible, the crystals were grown in an argon (Ar) ambient at a temperature of, for example, 1500° C.

The proportion (x) of Gd in $Gd_xY_{1-x}Ca_4O(BO_3)_3$ was varied to grow crystals of various compositions with x=0.30 or less.

The crystals obtained were confirmed to have homogeneous compositions and were solid solutions.

Figure 2:
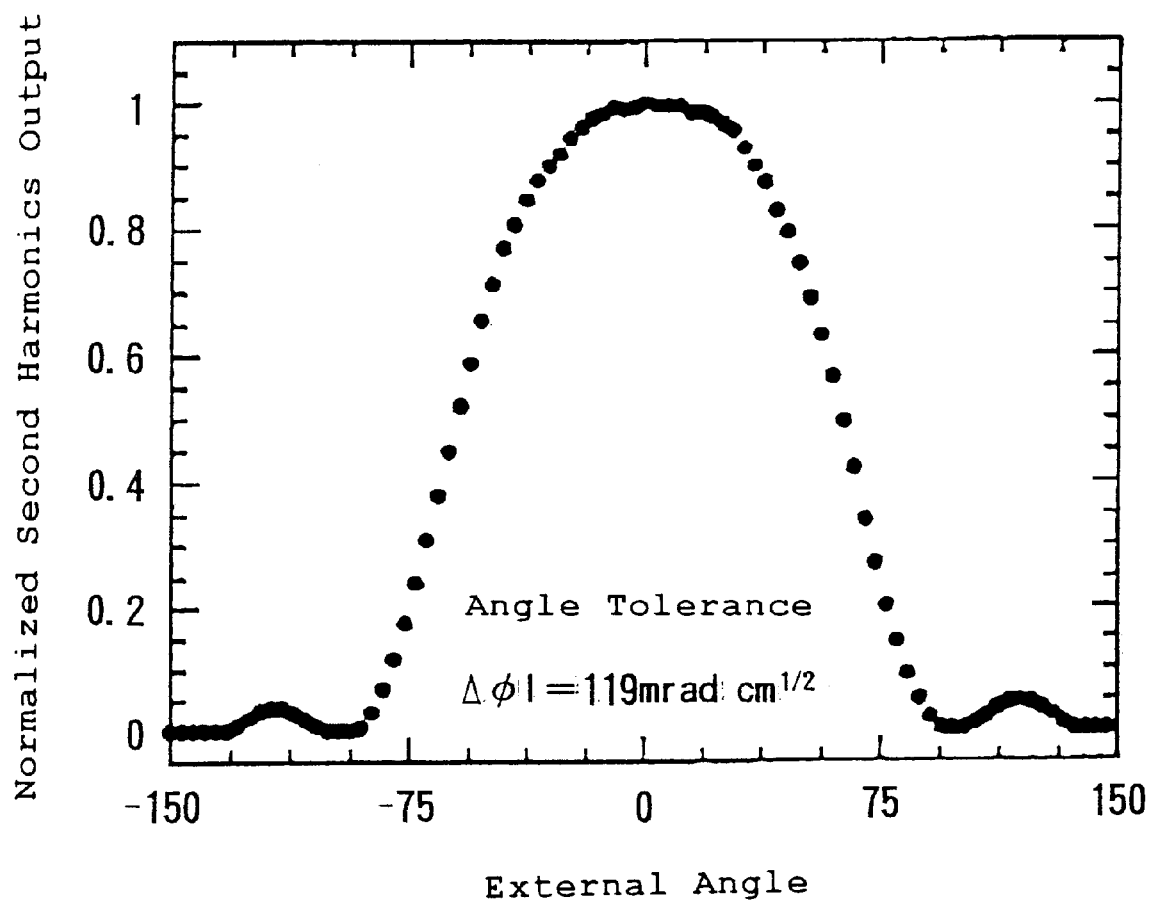
FIG. 2 illustrates the relationship between the external angles and normalized second harmonics outputs.

As shown in FIG. 2, in this embodiment, the value of x in the proximity of 0.28 was found to satisfy the non-critical phase matching condition of a phase matching angle 90° C. at a room temperature for second harmonics generation (type 2).

Figure 10:
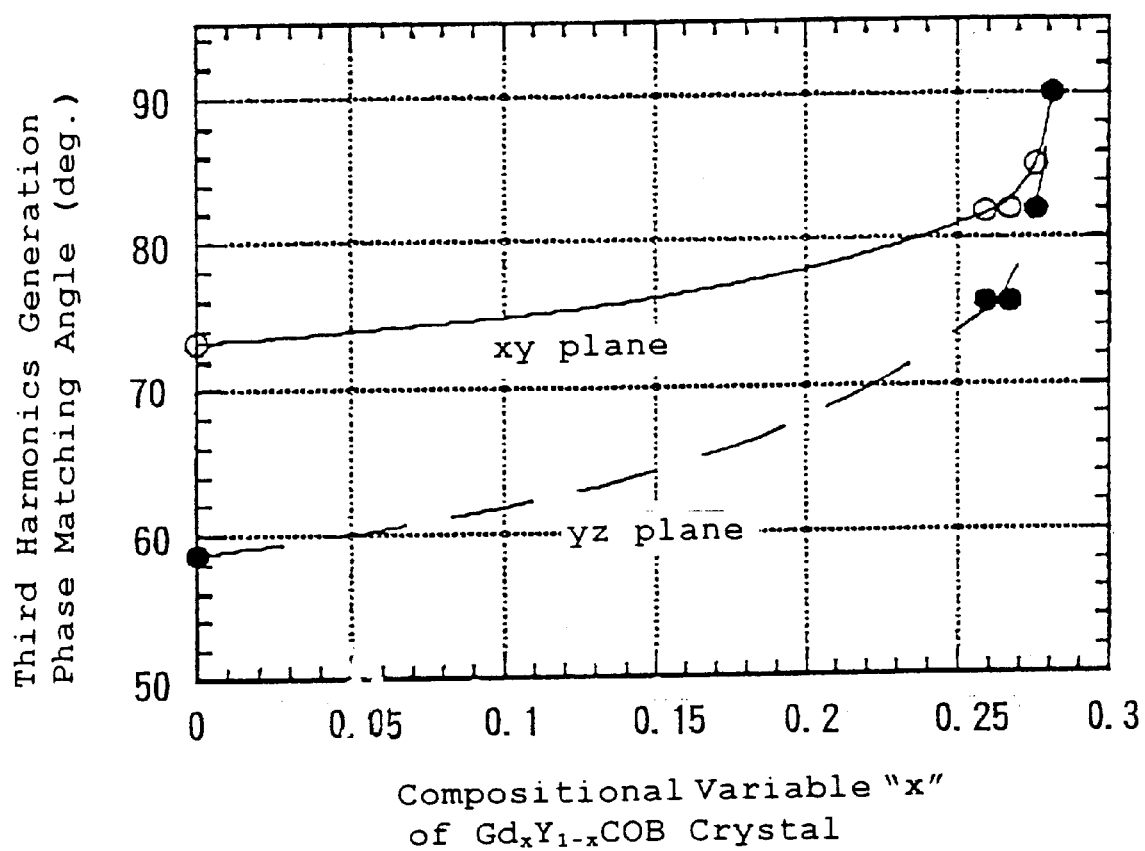
FIG. 10 is a diagram showing an exemplary relationship between compositions (x) and phase matching angles in generating third harmonics.

Also, in a crystal having a Gd composition in the proximity of x=0.28 was confirmed to be capable of outputting second harmonics with an approximate non-critical phase matching condition in the same direction as the direction that satisfies the non-critical phase matching condition for third harmonics generation (type 1) as shown in FIG. 10.

Example 3

Yb or Nd was doped to a $Gd_xY_{1-x}COB$ crystal. This doping was performed by mixing Yb or Nd into the raw materials of the $Gd_xY_{1-x}COB$ crystal during the crystal growth. The compositional ratio (x) was between 0.15 and 0.30, and the dose of Yb or Nd was 5 to 10%.

As a result of the evaluation performed on the crystal as an element for generating harmonics, the Yb/Nd-doped, Gd-and-Y-containing COB, was observed to generate the second and third harmonics of Nd:YAG laser in the same direction. An $Nd_{0.12}Gd_{0.16}Y_{0.72}COB$ crystal also, is one of such crystals.

As described in detail heretofore, the present invention provides $Gd_xY_{1-x}Ca_4O(BO_3)_3$ constituting a solid solution having a homogeneous composition, and an oxyborate crystal of plural types of rare earth elements as a wavelength conversion nonlinear optical crystal having superior optical properties, whose double refraction index can be controlled.

Moreover, the present invention also provides a novel nonlinear optical crystal for second harmonics generation, and a method and apparatus for generating second harmonics using this nonlinear optical crystal.

What is claimed is:

1. A wavelength conversion crystal represented by a formula (I), $M^1_xM^2_{1-x}Ca_4O(BO_3)_3$, wherein each of $M^1$ and $M^2$ represents one or more types of different rare earth elements selected from the group consisting of Gd, Y, La and Lu, and 0<x<1.

2. A method for generating a laser beam comprising performing wavelength conversion of light using the wavelength conversion crystal of claim 1.

3. An apparatus for generating a laser beam comprising the wavelength conversion crystal of claim 1.

4. A nonlinear optical crystal for second harmonics generation represented by a formula (II), $Gd_xY_{1-x}Ca_4O(BO_3)_3$, wherein $0.01 \leq x \leq 0.35$.

5. A method for generating a laser beam comprising performing wavelength conversion of light using the wavelength conversion crystal of claim 4.

6. An apparatus for generating a laser beam comprising the wavelength conversion crystal of claim 4.

7. The apparatus for generating a laser beam of claim 6, wherein a nonlinear optical crystal is used as means for generating third harmonics.

8. An apparatus for generating a laser beam comprising a nonlinear optical crystal element, which is a calcium oxyborate-type crystal comprising Gd and Y, to which Yd or Nd is doped, said nonlinear optical crystal element performing both the laser oscillation of a fundamental wave and generation of laser beams of second and third harmonics.

9. The apparatus for generating a laser beam of claim 8, wherein said calcium oxyborate-type crystal is represented by a formula (III), $Gd_xY_{1-x}Ca_4O(BO_3)_3$, wherein 0<x<1, and Yb or Nd is doped thereto.

10. The apparatus for generating a laser beam of claim 8, wherein said calcium oxyborate-type crystal comprises rare earth elements other than Gd and Y to substitute Gd or Y.

11. An apparatus for generating an ultraviolet laser beam comprising the apparatus of claim 8, wherein said apparatus of claim 8 comprises a wave plate and a reflective member for semiconductor laser excitation.

12. A method for generating a laser beam comprising performing wavelength conversion of light using the wavelength conversion crystal of claim 1.

13. An apparatus for generating a laser beam comprising the wavelength conversion crystal of claim 1.

14. The apparatus for generating a laser beam of claim 9, wherein said calcium oxyborate-type crystal comprises rare earth elements other than Gd and Y to substitute Gd or Y.

15. An apparatus for generating an ultraviolet laser beam comprising the apparatus of claim 10, wherein said apparatus of claim 10 comprises a wave plate and a reflective member for semiconductor laser excitation.

* * * * *